(12) United States Patent
Van Kester et al.

(10) Patent No.: US 12,274,236 B2
(45) Date of Patent: Apr. 15, 2025

(54) SYSTEM, VEHICLE AND METHOD FOR REMOVING MANURE FROM A STALL FLOOR

(71) Applicant: LELY PATENT N.V., Maassluis (NL)

(72) Inventors: Robin Andreas Albertus Van Kester, Maassluis (NL); Frank Hendrik Steeneveld, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 71 days.

(21) Appl. No.: 18/035,785

(22) PCT Filed: Dec. 7, 2021

(86) PCT No.: PCT/IB2021/061402
§ 371 (c)(1),
(2) Date: May 8, 2023

(87) PCT Pub. No.: WO2022/130121
PCT Pub. Date: Jun. 23, 2022

(65) Prior Publication Data
US 2023/0404025 A1     Dec. 21, 2023

(30) Foreign Application Priority Data
Dec. 15, 2020  (NL) ...................................... 2027114

(51) Int. Cl.
*A01K 1/01*     (2006.01)

(52) U.S. Cl.
CPC .................................. *A01K 1/0128* (2013.01)

(58) Field of Classification Search
CPC ...... A01K 1/0128; A01K 1/0146; A01K 1/01; B08B 3/02; B08B 9/0813; B08B 9/093;
(Continued)

(56) References Cited

U.S. PATENT DOCUMENTS 2,184,731 A * 12/1939 Brewer ................... A47L 9/183
                                                       222/557
2,966,256 A * 12/1960 McLeland ............ A01K 1/0128
                                                       104/244
(Continued)

FOREIGN PATENT DOCUMENTS

CA        3053190 A1 *  2/2020 ........... A01K 1/0128
CN      109691392 A  *  4/2019
(Continued)

OTHER PUBLICATIONS

International Search Report, issued in PCT/IB2021/061402, dated May 3, 2022.
(Continued)

*Primary Examiner* — Brady W Frazier
*Assistant Examiner* — Zoe Tam Tran
(74) *Attorney, Agent, or Firm* — Birch, Stewart, Kolasch & Birch, LLP

(57) ABSTRACT

A system for removing manure from a floor in an animal shed includes an autonomous manure removal vehicle with a manure storage container, which is provided with an interior, and a manure discharge opening for discharging manure from the interior of the manure storage container. A manure introduction device is configured for introducing manure from the floor and moving the introduced manure to the interior of the manure storage container. A dump is provided with a dump opening in the floor for dumping manure from the manure discharge opening of the manure storage container through the dump opening into a manure reservoir which extends under the floor. A flushing device is provided for flushing the interior of the manure storage container with flushing liquid, such as water.

18 Claims, 5 Drawing Sheets

(58) Field of Classification Search
CPC .... A47L 7/0038; A47L 9/183; A47L 11/4013; A47L 11/4016; A47L 11/4025; A47L 2201/024
USPC .......................................................... 119/451
See application file for complete search history.

(56) References Cited

U.S. PATENT DOCUMENTS

| | | | | |
|---|---|---|---|---|
| 5,062,387 | A * | 11/1991 | Anderson | A01K 1/01 119/450 |
| 2007/0186368 | A1 * | 8/2007 | Field | A47L 11/302 15/320 |
| 2009/0208654 | A1 * | 8/2009 | MacFarlane | B08B 5/04 427/299 |
| 2009/0241839 | A1 * | 10/2009 | Linsmeier | B08B 9/08 15/93.1 |
| 2011/0118680 | A1 * | 5/2011 | Michaels | A47L 7/0038 604/317 |
| 2013/0220387 | A1 * | 8/2013 | Crocker | B08B 3/14 134/111 |
| 2019/0150394 | A1 * | 5/2019 | Griffin | A01K 1/0128 |
| 2019/0391589 | A1 * | 12/2019 | Komorida | A01D 34/008 |

FOREIGN PATENT DOCUMENTS

| | | | |
|---|---|---|---|
| NL | 2007568 A * | 8/2012 | |
| WO | WO 2013/010785 A1 | 1/2013 | |
| WO | WO 2017/069615 A1 | 4/2017 | |

OTHER PUBLICATIONS

Written Opinion of the International Searching Authority, issued in PCT/IB2021/061402, dated May 3, 2022.

* cited by examiner

SYSTEM, VEHICLE AND METHOD FOR REMOVING MANURE FROM A STALL FLOOR

The invention relates to a system for removing manure from a floor in an animal shed, in particular manure from cows, such as dairy cows or meat cows.

The Lely Discovery 120 Collector® is known. This is an autonomous manure removal vehicle for removing manure from the floor of an animal shed. The vehicle is situated between the animals in the animal shed. The vehicle has a manure introduction device for introducing manure from the floor and moving the introduced manure to the interior of a manure storage container. While travelling, the vehicle collects manure from the floor in the interior of the manure storage container. The manure storage container has a bottom, in which a manure discharge opening for discharging manure is arranged. In order to empty the manure storage container, the manure removal vehicle travels to a dump with a dump opening in the floor, which ends in a manure reservoir which extends under the floor. When the manure discharge opening of the manure removal vehicle is situated over the dump opening, the manure from the manure storage container is discharged to the manure reservoir via the dump opening.

However, it has been found in practice that, after the manure has been discharged to the manure reservoir, an amount of manure remains behind in the manure storage container. This applies particularly in the case of relatively thick manure. As time passes, the manure which remains behind may form a hard layer in the manure storage container. In addition, sand may accumulate in the manure storage container, which is carried along by the manure introduction device during removal of manure from the floor, in particular when the manure removal vehicle is used in sand-bottomed animal sheds. Other residues may also remain behind, such as cubicle litter. However, if manure or sand or other residues remain behind in the tank, the storage capacity of the manure storage container is reduced.

It is an object of the invention to provide an improved system for removing manure from a floor in an animal shed, wherein in particular the storage capacity of the manure storage container remains substantially intact, even after prolonged use.

According to the invention, this object is achieved by a system for removing manure from a floor in an animal shed, which system is provided with:
  an autonomous manure removal vehicle, which is in particular configured to autonomously travel along at least one route between the animals in the animal shed, which manure removal vehicle comprises
    a manure storage container which is provided with an interior, and a manure discharge opening for discharging manure from the interior of the manure storage container,
    a manure introduction device for introducing manure from the floor and moving the introduced manure to the interior of the manure storage container, in particular for temporarily collecting this manure therein,
  a dump which is provided with a dump opening in the floor for dumping, via or through the dump opening, manure from the manure discharge opening of the manure storage container into a manure reservoir which extends under the floor,
wherein the system is provided with a flushing device for flushing the interior of the manure storage container with or using flushing liquid, such as water.

The manure removal vehicle according to the invention is configured to autonomously travel along at least one route between the animals in the animal shed. While travelling, the manure removal vehicle collects manure from the floor in the interior of the manure storage container. The manure introduction device picks up the manure from the floor and moves the picked-up manure to the interior of the manure storage container. The manure is temporarily stored therein. When the manure storage container has become full, the manure removal vehicle drives to the dump. The manure discharge opening may be arranged in a bottom of the manure storage container. When this manure discharge opening of the manure removal vehicle is situated over the dump opening, the manure from the manure storage container is discharged to the manure reservoir via or through the dump opening. On account of the force of gravity, the manure drops down. The flushing device according to the invention makes it possible to flush the interior of the manure storage container with the flushing liquid, in particular water. If the flushing device is used after the manure removal vehicle has dumped manure from the manure storage container into the manure reservoir under the floor, manure residues, in particular thick manure which has remained behind, possible sand residues, cubicle litter and/or other matter which has remained behind, can be flushed out of the manure storage container. Every time the manure removal vehicle has dumped the manure from the manure storage container into the dump opening, a flushing operation may be performed in order to ensure that the manure storage container is substantially empty. As a result thereof, manure and sand residues or other residues will not accumulate, and the storage capacity of the manure storage container remains substantially intact, even after prolonged use.

A further advantage is the fact that the weight distribution remains optimal. As has been described above, it is possible, with the known Lely Discovery 120 Collector®, for manure or sand to remain behind in the manure storage container after the manure has been dumped in the manure reservoir. This has an adverse effect on the weight distribution, as a result of which the vehicle may develop a tendency to tilt backwards while travelling. By means of the flushing device according to the invention, it can be ensured that no or hardly any manure or sand residues, or other residues, remain behind in the manure storage container, so that the weight distribution is not adversely affected as a result thereof.

It should be noted that CN 109691392 A discloses a manure cleaning device, which can be pushed across the floor of an animal shed by a user by hand. The manure cleaning device has a manure scraper for picking up manure from the floor. A suction device moves the picked-up manure to a manure storage tank via a suction tube. When the manure storage tank is full, the manure is discharged via a discharge opening. The manure cleaning device has a water tank which is connected, by means of a line with a water pump, to a spray head which ends in the interior of the manure storage tank.

In an embodiment, the flushing device is configured for flushing the interior of the manure storage container at least while the manure storage container has substantially been emptied by and/or after dumping of manure from the manure discharge opening. In particular, the flushing device flushes the interior of the manure storage container with the flushing liquid for at least a time period immediately after the manure, which was collected temporarily in the interior of the manure storage container, has been dumped into the manure reservoir under the floor via the dump opening. As a result thereof, the interior of the manure storage container is rinsed and any residues of manure and sand or other matter flow out of the manure discharge opening, together with the flushing liquid. Thereafter, the manure storage container is substantially entirely empty and the manure removal vehicle is ready to travel along a route between the animals in the animal shed again in order to remove manure from the floor and collect it in the manure storage container.

According to the invention, it is furthermore possible for the flushing device to be configured for flushing the interior of the manure storage container while dumping manure from the manure discharge opening. In this case, the flushing device starts to flush the interior of the manure storage container with the flushing liquid, while the manure which has been temporarily collected in the interior of the manure storage container is being dumped into the manure reservoir under the floor via the dump opening. While dumping the manure from the manure discharge opening, i.e. while the manure storage container is being emptied, the flushing device feeds the flushing liquid to the manure storage container. The flushing liquid mixes with the manure and then flows, together with the manure from the manure discharge opening, via the dump opening, into the manure reservoir. Consequently, the manure is slightly diluted, as a result of which in particular thick manure is able to flow from the manure storage container more easily. This means that less manure remains behind and the flushing time after dumping can be reduced. Incidentally, the flushing device may be configured in such a way that it only becomes active after the start of the dumping process, i.e. with a delay. As a result thereof, it is possible to reduce the amount of flushing liquid which ends up in the manure reservoir under the floor together with the discharged manure.

In an embodiment, the flushing device is configured for flushing the interior of the manure storage container for an adjustable flushing time. In particular, a control system is provided which is configured to adjust the flushing time. The flushing time may be input as a time duration (in minutes and/or seconds) by a farmer, for example manually. The flushing time is, for example, between 30 seconds and 5 minutes, in particular between 1 and 3 minutes. In this case, it is also possible to adjust the time the flushing device starts to flush, for example by means of a specified delay time after the manure discharge opening of the manure removal vehicle is positioned over the dump opening and has started dumping the manure.

In an embodiment, the manure storage container comprises a bottom, which slopes obliquely towards the manure discharge opening, which is situated at a lowest level of the bottom, and wherein the flushing device is configured for spraying flushing liquid in such a way that this flushing liquid ends up in a highest area of the bottom. In this case, the flushing device for example comprises at least one spray head, which is configured to spray flushing liquid in such a way that this flushing liquid ends up in a highest area of the bottom. In this case, the manure discharge opening is situated in the bottom. The bottom slopes obliquely downward towards the manure discharge opening which is situated at a lowest level of the bottom. The flushing device, in particular the spray head, sprays the flushing liquid in such a way that this flushing liquid ends up in a highest area of the bottom. In this case, the flushing liquid substantially covers the entire surface of the bottom: the flushing liquid is sprayed onto the highest areas of the bottom and from there, the flushing liquid flows along the obliquely downwardly sloping bottom to the manure discharge opening on account of the force of gravity, and carries along manure and sand residues and any other residues in the process. As a result thereof, undesirable residues can be substantially entirely removed from the manure storage container.

In an embodiment, the manure removal vehicle comprises two side walls, which each comprise a wheel arch for accommodating a wheel, and in particular also an associated electrical drive motor, wherein the side walls with the wheel arches delimit the interior of the manure storage container on the inside thereof, and wherein the flushing device, in particular a spray head of the flushing device, is configured for spraying flushing liquid in at least one area of the interior of the manure storage container which, viewed in the direction of travel of the manure removal vehicle, is situated before and/or behind the wheel arches. The areas before and/or behind the wheel arches may form "dead zones", in which manure and sand residues and/or other residues tend to remain behind when the manure is being dumped. By directing the flushing device, in particular the spray head thereof, exactly onto those areas, particularly efficient rinsing is achieved.

For example, viewed in the direction of travel of the manure removal vehicle, the manure discharge opening is situated in front of the wheel arches, with the bottom of the manure storage container sloping obliquely from the rear towards the front, towards the manure discharge opening, and wherein the flushing device, in particular the spray head thereof, is configured for spraying flushing liquid in an area of the interior of the manure storage container behind the wheel arches. As a result thereof, the flushing liquid effectively reaches substantially all areas of the bottom, as a result of which manure and sand residues and/or other residues are effectively discharged. However, the manure discharge opening may also, viewed in the direction of travel of the manure removal vehicle, be situated behind or between the wheel arches, in which case the flushing device, in particular the spray head thereof, can be directed in another suitable way in order to flush the interior of the manure storage container.

In an embodiment, the flushing device is configured for spraying flushing liquid into the interior of the manure storage container. For example, the flushing device comprises at least one spray head which is arranged inside the interior of the manure storage container for spraying flushing liquid into the interior of the manure storage container. If the spray head is arranged in the interior of the manure storage container, the spray head can easily be directed in order to accurately determine which part inside the interior of the manure storage container will be sprayed. As a result thereof, it is possible to flush the manure storage container in a particularly efficient way. Obviously, one or more spray heads for spraying flushing liquid may be provided in the interior of the manure storage container.

In this case, it is furthermore possible, according to the invention, for the manure removal vehicle to comprise a water system for spraying water on the floor, which water system is provided with at least one water reservoir for accommodating water, at least one spray head for spraying water on the floor, and a water supply connection for supplying water to the water system, wherein the water supply connection, the water reservoir and the spray head of the water system are connected to each other by means of a pipe system, and wherein the flushing device, in particular the spray head thereof, is connected to the water system.

In order to assist the manure removal vehicle in picking up manure from the floor, in particular when the manure introduction device is configured for sucking up manure, it is advantageous if the floor of the animal shed is wetted. The water system of the manure removal vehicle which is configured for spraying water on the floor serves this purpose. For example, a spray head of the water system is arranged on a front side of the manure removal vehicle, with this spray head spraying water on the floor in front of the manure removal vehicle while the manure removal vehicle travels in a forward direction of travel. In other words, this spray head always sprays water in an area of the floor towards which the manure removal vehicle is travelling. In addition, the water system may comprise a further spray head which is configured, for example, to spray water on the area of the floor behind the manure removal vehicle. If the manure removal vehicle is provided with a water system, it is particularly advantageous to incorporate or integrate the flushing device and/or the spray head thereof with the latter. As a result thereof, the desired flushing functionality can easily be added.

In a particular embodiment, the water supply connection of the water system of the manure removal vehicle is couplable to a water storage connection, which is situated, in particular, near the dump, for supplying water to the water system in order to fill the water reservoir and to allow the flushing device, in particular the spray head thereof, to spray water. Water can be supplied to the water system via the water storage connection near the dump. This water is simultaneously used for flushing. As a result thereof, efficient flushing of the manure storage container is achieved by means of a simple design.

In a preferred embodiment, the spray head of the flushing device is connected to a pipe of the pipe system of the water system by means of a non-return valve, and for example also a branch pipe. A spray opening of the flushing device, possibly comprising a non-return valve, may also be incorporated or integrated with the water reservoir of the water system, in which case the water reservoir comprises, for example, one or more water bags, which are connected to the pipe system of the water system. The non-return valve prevents a counterflow from the interior of the manure storage container into the pipe system. Although water may flow from the pipe system out of the spray head via the non-return valve, the flow resistance of the non-return valve is greater than the pressure in the pipe system to the water reservoir. After the water supply connection of the manure removal vehicle has been coupled to the water storage connection, for example a water buffer vessel or water pipe, water from the water storage connection consequently first flows to the water reservoir. Only after the water reservoir of the water system has been filled substantially entirely with water, the flow resistance of the non-return valve is overcome and the spray head automatically starts to spray water into the interior of the manure storage container.

Preferably, the water storage connection of the dump and the water supply connection of the manure removal vehicle are configured to be coupled when the manure removal vehicle has been driven until it is over the dump opening on the dump in order to dump the manure. In other words, while the manure from the manure storage container is being dumped into the manure reservoir under the floor, the water reservoir of the water system is being filled with water. After the water reservoir has then been substantially entirely filled with water, the spray head of the flushing device begins to spray water as long as the coupling between the water supply connection of the manure removal vehicle and the water storage connection remains intact. The flushing time depends on the time duration of this coupling.

In a further embodiment, the flushing device is arranged in or near the dump opening of the dump, the flushing device being configured for spraying flushing liquid via or through the manure discharge opening into the interior of the manure storage container when the manure discharge opening of the manure removal vehicle is situated over the dump opening. In particular, the flushing device comprises at least one spray head which is arranged in or near the dump opening of the dump, the spray head being configured for spraying flushing liquid into the interior of the manure storage container via or through the manure discharge opening when the manure discharge opening of the manure removal vehicle is situated over the dump opening. Instead of arranging a spray head in the interior of the manure storage container, it is also possible to arrange one or more spray heads or other spray openings of the flushing device outside thereof and to spray flushing liquid into the interior of the manure storage container via or through the manure discharge opening. As a result thereof, efficient flushing is also made possible in order to flush manure and sand residues and/or other residues out of the manure storage container of the manure removal vehicle.

In this case, it is possible, according to the invention, for the flushing device to be provided with a water storage connection which is connected to a spray opening of the flushing device by means of an operable valve and a supply line, for example having one or more spray heads, wherein the valve is operable by a control unit which is connected to a sensor device configured to detect if the manure discharge opening of the manure removal vehicle is situated over the dump opening. The sensor device comprises, for example, a pressure switch which is arranged to be operated by the manure removal vehicle when the manure removal vehicle has driven onto the dump in such a way that the manure discharge opening of the manure removal vehicle is positioned over the dump opening. When the pressure switch is pressed, the control unit opens the operable valve, so that water from the water storage connection flows to the spray opening via the supply line. The spray opening then starts to spray water into the interior of the manure storage container via the manure discharge opening. It is possible for the control unit to close the valve again when the manure removal vehicle leaves the dump and no longer depresses the pressure switch. In addition, the control unit may comprise a time switch in order to determine a flushing time, i.e. the control unit only closes the valve once the time switch determines that the flushing time has elapsed.

In addition, it is preferable, according to the invention, that the flushing device is configured for spraying the flushing liquid at a pressure which is at least 0.2 bar, in particular at least 1 bar or 3 bar higher than the atmospheric pressure. This pressure determines the force with which the flushing device sprays the flushing liquid from the flushing device. Due to the increased pressure, manure residues and other dirt may be sprayed off the inner walls of the manure storage container. This results in a thorough cleaning operation.

In a preferred embodiment according to the invention, the flushing device is configured for spraying the flushing liquid at a flow rate or volumetric rate of at least 3 liters per minute, in particular at least 5 liters per minute or 10 liters per minute or 50 liters per minute. At such a flow rate, removing manure and/or sand residues from the manure storage container of an autonomous manure removal vehicle for use in a shed for keeping animals, such as cows or pigs, has been found to be particularly efficient.

The invention furthermore relates to an autonomous manure removal vehicle for removing manure from a floor in an animal shed, which manure removal vehicle is in particular configured to autonomously travel along at least one route between the animals in the animal shed, and which manure removal vehicle is provided with:
- a manure storage container, which is provided with an interior, and a manure discharge opening for discharging manure from the interior of the manure storage container,
- a manure introduction device for introducing manure from the floor and moving the introduced manure to the interior of the manure storage container, wherein the manure removal vehicle is provided with a flushing device for flushing the interior of the manure storage container with or using flushing liquid, such as water.

This manure removal vehicle may be configured and have the same technical effects and advantages as described above with regard to the system according to the invention.

The invention also relates to a method for removing manure from a floor in an animal shed, which method comprises:
- moving an autonomous manure removal vehicle across the floor between animals, such as cows, in the animal shed, in particular by making the manure removal vehicle travel autonomously along at least one route between the animals in the animal shed, wherein the manure removal vehicle picks up manure from the floor and moves it to an interior of a manure storage container for temporarily collecting manure in the manure removal vehicle,
- driving the manure removal vehicle to a dump, which is provided with a dump opening in the floor for dumping manure into a manure reservoir which extends under the floor,
- dumping manure from a manure discharge opening of the manure storage container of the manure removal vehicle into the manure reservoir via the dump opening,
- flushing the interior of the manure storage container with flushing liquid, such as water, in particular after and/or while dumping the manure.

The method according to the invention has the same technical effects and advantages as described above with regard to the system according to the invention.

The invention will now be explained in greater detail by means of the attached figures.

Figure 1:
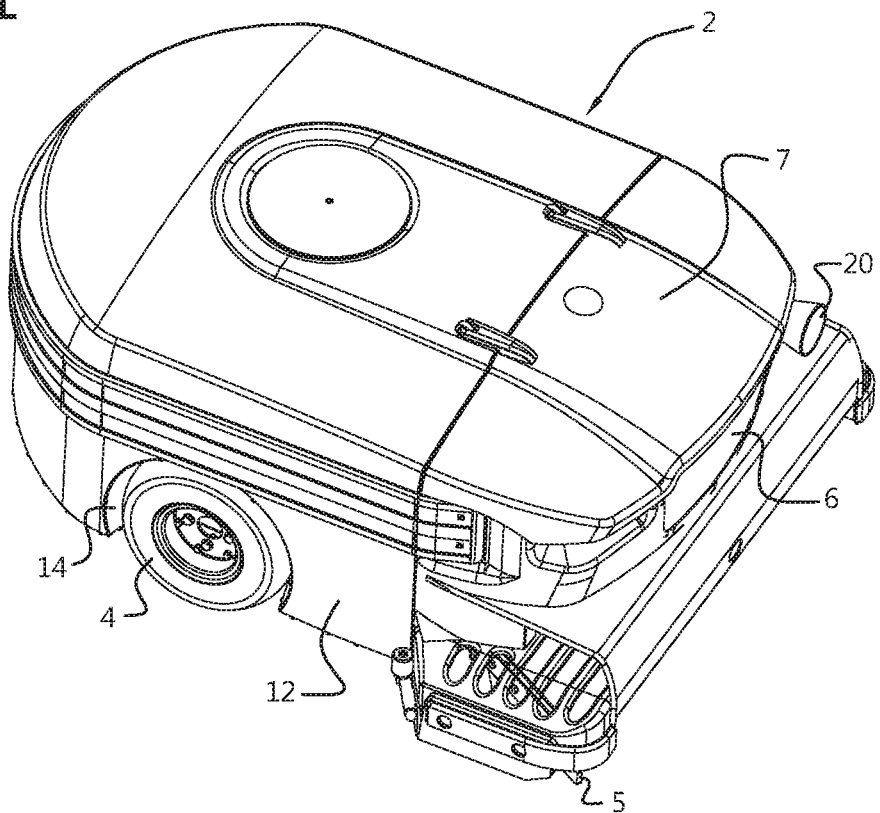
FIG. 1 shows a perspective view of a manure removal vehicle for use with a first embodiment of a system for removing manure from a floor in an animal shed according to the invention.

A system 1 for removing manure of a floor 3 in a shed with animals, such as cows, comprises a manure removal vehicle 2. Manure and other excretory products of the animals are situated on the floor 3. The manure removal vehicle 2 is situated on the floor 3 between the animals. In this exemplary embodiment, the manure removal vehicle 2 is supported on the floor 3 by means of two wheels 4 and a manure slide 5 (see FIG. 3). However, the manure removal vehicle 2 may also be supported differently, for example by means of a front wheel or a support element, such as a slide block.

The manure removal vehicle 2 is unmanned and self-propelled. The manure removal vehicle 2 is able to autonomously find its way by means of an electronic control system with sensors, such as an ultrasound sensor and a gyroscope (not shown). On the basis of the signals detected by the sensors, the control system controls a drive system with electrical drive motors for the wheels 4 of the manure removal vehicle 2. Due to the wheels being operable independently from one another, the manure removal vehicle 2 can be steered and travel along a desired route. The drive system and the control system are fed by a battery system on board of the manure removal vehicle 2. The battery system comprises a rechargeable battery.

The rechargeable battery of the battery system and electronic components of the control system, which cannot withstand manure or urine, are accommodated in a housing 6 of the manure removal vehicle 2. In this exemplary embodiment, this housing 6 is fitted above the manure slide 5. The housing 6 comprises an access opening, for example for maintenance purposes. The access opening is closable by a hingeable cover 7.

Behind the housing 6, there is a manure storage container 8, which delimits an interior 9, in which manure can be temporarily collected. The manure storage container 8 comprises a bottom 10, which slopes obliquely towards a manure introduction and discharge opening 11, which is provided on a lowest level of the bottom 10. The interior 9 of the manure storage container 8 is furthermore delimited by the inside of the two side walls 12 of the manure removal vehicle 2. In each side wall 12, a wheel arch 14 for accommodating a wheel 4 and associated electrical drive motor is formed.

Although in this exemplary embodiment, the manure storage container 8 has a single manure introduction and discharge opening 11, i.e. manure picked up from the floor is supplied to the manure storage container 8 via this opening 11 and the collected manure leaves the manure storage container 8 via the same opening 11 when emptying the manure storage container 8, but it is also possible for the manure removal vehicle 2 to have two separate openings: a first opening for introducing manure and a second opening for discharging manure. This is illustrated, for example, in the manure removal vehicle shown in FIG. 7, which will be explained in more detail below.

The manure slide 5 forms part of a manure introduction device for introducing manure from the floor 3 and moving the introduced manure to the interior 9 of the manure storage container 8. During travel, manure collects on the floor in front of the manure slide 5, which extends partly around the manure introduction and discharge opening 11. In this exemplary embodiment, an air pump is provided in the interior 9 of the manure storage container 8 to apply a reduced pressure, as a result of which manure is sucked from the floor 3 and flows to the interior 9 of the manure storage container 8 via the manure introduction and discharge opening 11. There, the manure is stored until the manure storage container 8 has been substantially filled.

A manure introduction device for sucking up manure is described in detail in WO 2013/010785 A1, the contents of which are incorporated by reference in the present patent application, and will not be explained in any more detail now. It should be noted that the manure introduction device may also be configured differently, as will be explained below by means of FIG. 7.

When the manure storage container 8 is full, the manure removal vehicle 2 travels to a dump 15 in order to empty the manure storage container 8. At the dump 15, a dump opening 16 is provided in the floor 3, which leads to a manure reservoir 17 which extends under the floor 3. When the manure introduction and discharge opening 11 of manure removal vehicle 2 is situated over the dump opening 16 (see FIG. 3), the control system switches off the air pump, as a result of which the reduced pressure in the interior 9 of the manure storage container 8 is cancelled and the manure flows from the manure storage container 8 into the manure reservoir 17 on account of the force of gravity, via the dump opening 16.

In order to efficiently remove manure and sand residues or other matter which has remained behind after the manure has been dumped, according to the invention a flushing device 18 is provided for flushing the interior of the manure storage container with flushing liquid, such as water. The flushing device may be configured in various ways.

Figure 2:
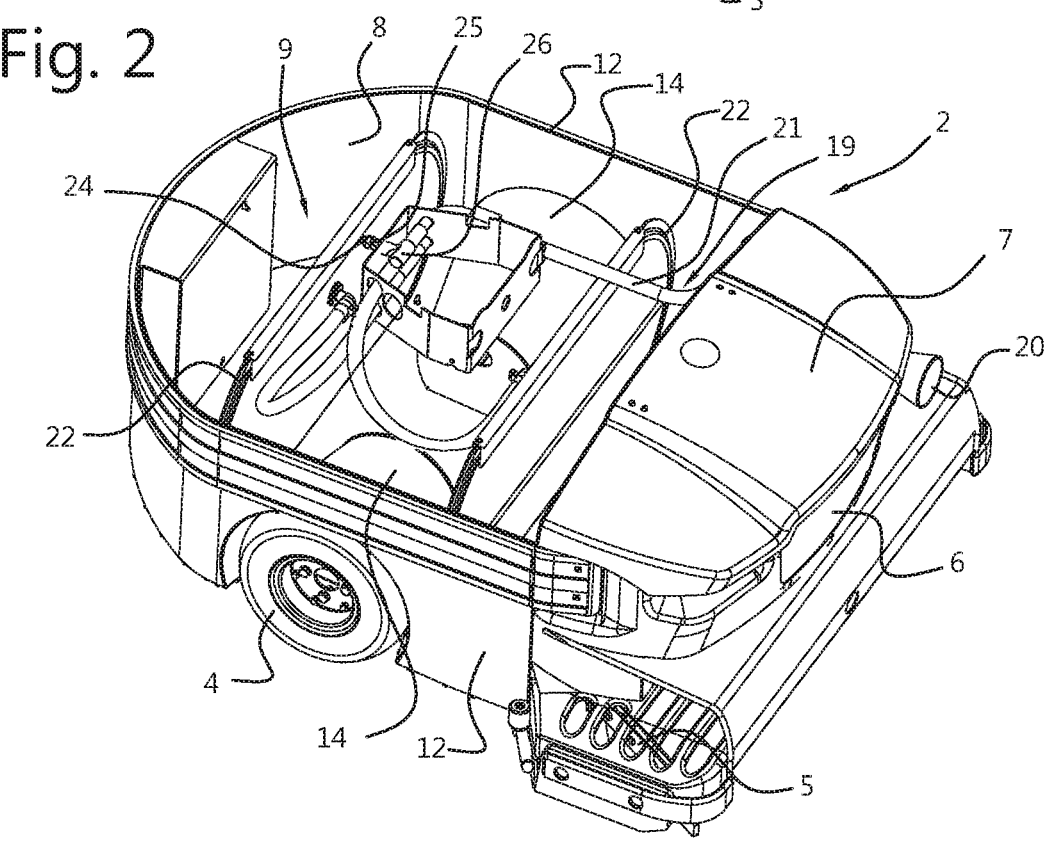
FIG. 2 shows a partially cut-away view in perspective of the manure removal vehicle illustrated in FIG. 1.
Figure 3:
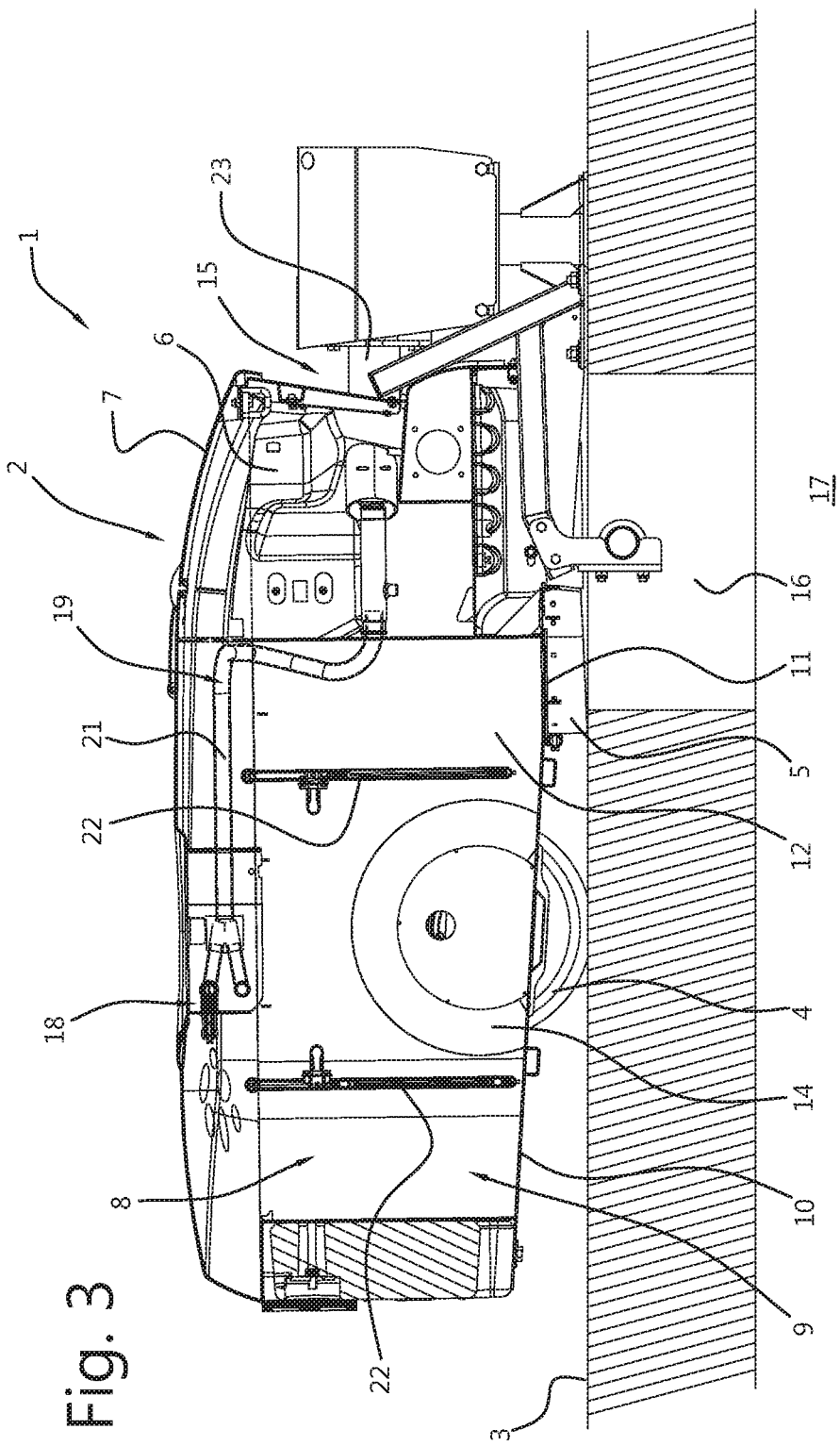
FIG. 3 shows a side view in cross section of the manure removal vehicle illustrated in FIG. 1 on a dump of the system for removing manure from a floor in an animal shed according to the first embodiment.
Figure 4:
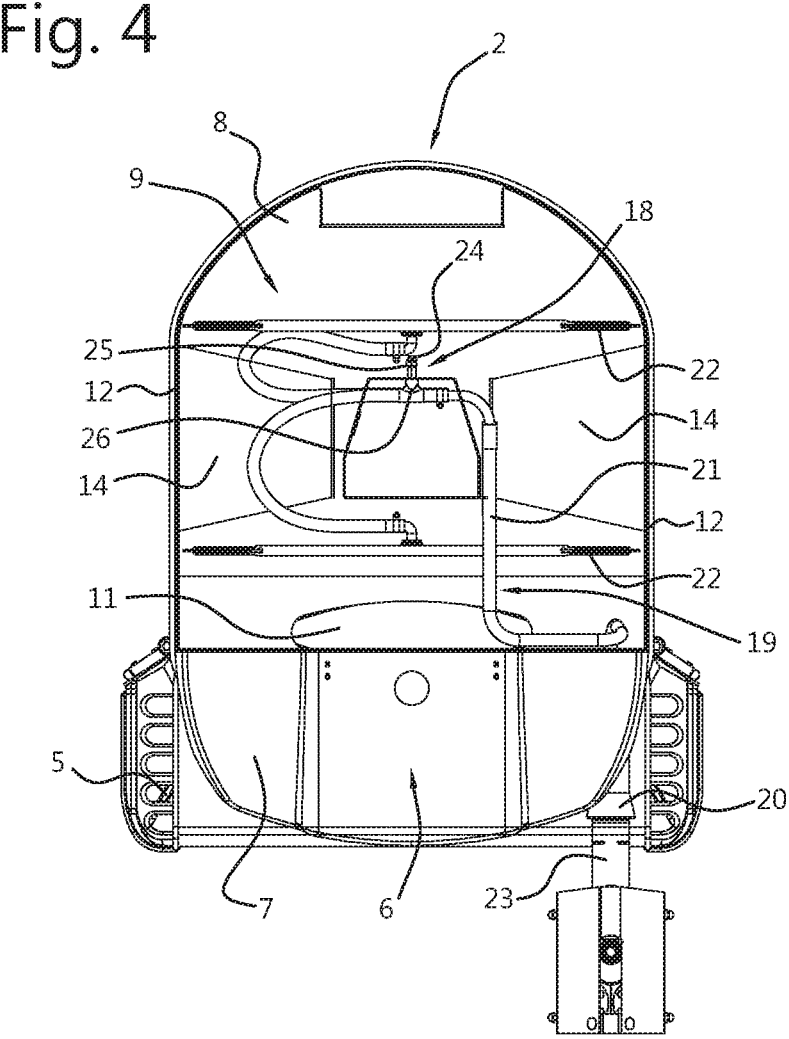
FIG. 4 shows a top view of the manure removal vehicle illustrated in FIG. 3 on the dump.

In the embodiment illustrated in FIGS. 1-4, the flushing device 18 is integrated with a water system 19 of the manure removal vehicle 2, which is configured for spraying water on the floor 3. It is advantageous to wet the floor 3 in order to facilitate picking up manure from the floor 3. As can be seen in FIGS. 2 and 4, the water system 19 in this exemplary embodiment comprises a water supply connection 20 for supplying water to the water system 19. The water supply connection 20 is couplable to a water storage connection 23 (see FIG. 4), which is situated near the dump 15. The water storage connection 23 comprises, for example, a water buffer vessel or water pipe (not shown).

The water storage connection 23 of the dump 15 and the water supply connection 20 of the manure removal vehicle 2 are automatically coupled to supply water to the water system 19 when the manure removal vehicle 2 has been driven until it is over the dump opening 16 on the dump 15 in order to dump the manure. In other words, while the manure is being dumped from the manure storage container 8 into the manure reservoir 17 under the floor 3, the water system 19 is supplied with water.

The water supply connection 20 of the manure removal vehicle 2 is connected to two water reservoirs 22 for accommodating water by means of a pipe system 21. In this exemplary embodiment, the water reservoirs 22 are formed as flexible water bags, as described in WO 2017/069615 A1. In FIGS. 3 and 4, the water bags 22 are not filled with water and are consequently substantially flat. When the water bags 22 are being filled with water, the volume of the water bags 22 increases. Obviously, it is also possible to use only one water reservoir, and the water reservoir may be configured differently, for example as a plastic or metal tank.

The water reservoirs 22 are furthermore connected to one or more spray heads for spraying water on the floor (not shown) by means of the pipe system 21. For example, a spray head of the water system 19 is arranged on a front side of the manure removal vehicle 2, in which case this spray head sprays water on the floor 3 in front of the manure removal vehicle 2 while the manure removal vehicle 2 is travelling forwards. In other words, this spray head always sprays water in an area of the floor 3 towards which the manure removal vehicle 2 is travelling. In addition, the water system may comprise a further spray head, which is configured, for example, to spray the area of the floor 3 behind the manure removal vehicle 2 with water.

In this exemplary embodiment, the flushing device 18 for flushing the manure storage container 8 which is integrated with the water system 19 comprises a spray head 24 which is arranged inside the interior 9 of the manure storage container 8 for spraying flushing liquid into the interior 9 of the manure storage container 8. The spray head 24 is connected to the pipe system 21 of the water system 19 by means of a non-return valve 25 and a branch pipe 26. The non-return valve 25 prevents a counterflow from the interior 9 of the manure storage container 8 into the pipe system 21.

Although water may flow from the pipe system 21 out of the spray head 24 via the non-return valve 25, the flow resistance of the non-return valve 25 is greater than the pressure in the pipe system 21 towards the water reservoirs 22. After the coupling of the water supply connection 20 of the manure removal vehicle 2 with the water storage connection 23 has been brought about, water first flows from the water supply connection 23 to the water reservoirs 22. Only once the water reservoirs 22 have been substantially entirely filled with water, the flow resistance of the non-return valve 25 is overcome and the spray head 24 automatically starts to spray water into the interior 9 of the manure storage container 8.

The spray head 24 is configured for spraying water in the areas of the interior 9 of the manure storage container 8 which, viewed in the direction of travel of the manure removal vehicle 2, are situated behind the wheel arches 14. The water then ends up in the highest areas of the bottom 10. The areas behind the wheel arches 14 may form "dead zones", in which manure and sand residues and/or other residues tend to remain behind when the manure is being dumped. By directing the spray head 24 precisely at those areas, substantially the entire bottom 10 is rinsed. The water sprayed behind the wheel arches 14 runs from the highest areas of the bottom 10, via the obliquely downwardly sloping bottom 10 of the manure storage container 8, to the manure introduction and discharge opening 11, which is situated at a lowest level of the bottom 10 and, viewed in the direction of travel of the manure removal vehicle 2, is provided in front of the wheel arches 14. In this case, manure and sand residues and other residual matter is discharged concomitantly.

Therefore, the flushing device in this exemplary embodiment is configured for flushing the interior 9 of the manure storage container 8 during and/or after dumping of the manure from the manure introduction and discharge opening 11. The flushing device starts to flush the interior 9 of the manure storage container 8 with water while the manure which is collected temporarily in the manure storage container 8 is or has been dumped in the manure reservoir 17 under the floor 3, via the dump opening 16.

The flushing device continues to flush with water for as long as the coupling between the water supply connection 20 of the manure removal vehicle 2 and the water storage connection 23 remains intact. The flushing time depends on the time duration of this coupling and may be adjusted, for example by the farmer keying in the flushing time manually as a time period (in minutes and/or seconds). The flushing time is, for example, between 1 and 3 minutes. Flushing at least also takes place after the manure storage container 8 has been substantially emptied after the manure was dumped from the manure introduction and discharge opening 11. This is when flushing has the greatest effect. When the manure and sand residues and any other residues have been flushed away, the manure storage container 8 is substantially entirely empty and the manure removal vehicle 2 is ready to again travel a route between the animals in the animal shed in order to remove manure from the floor 3 and to collect it in the interior 9 of the manure storage container 8.

Figure 5:
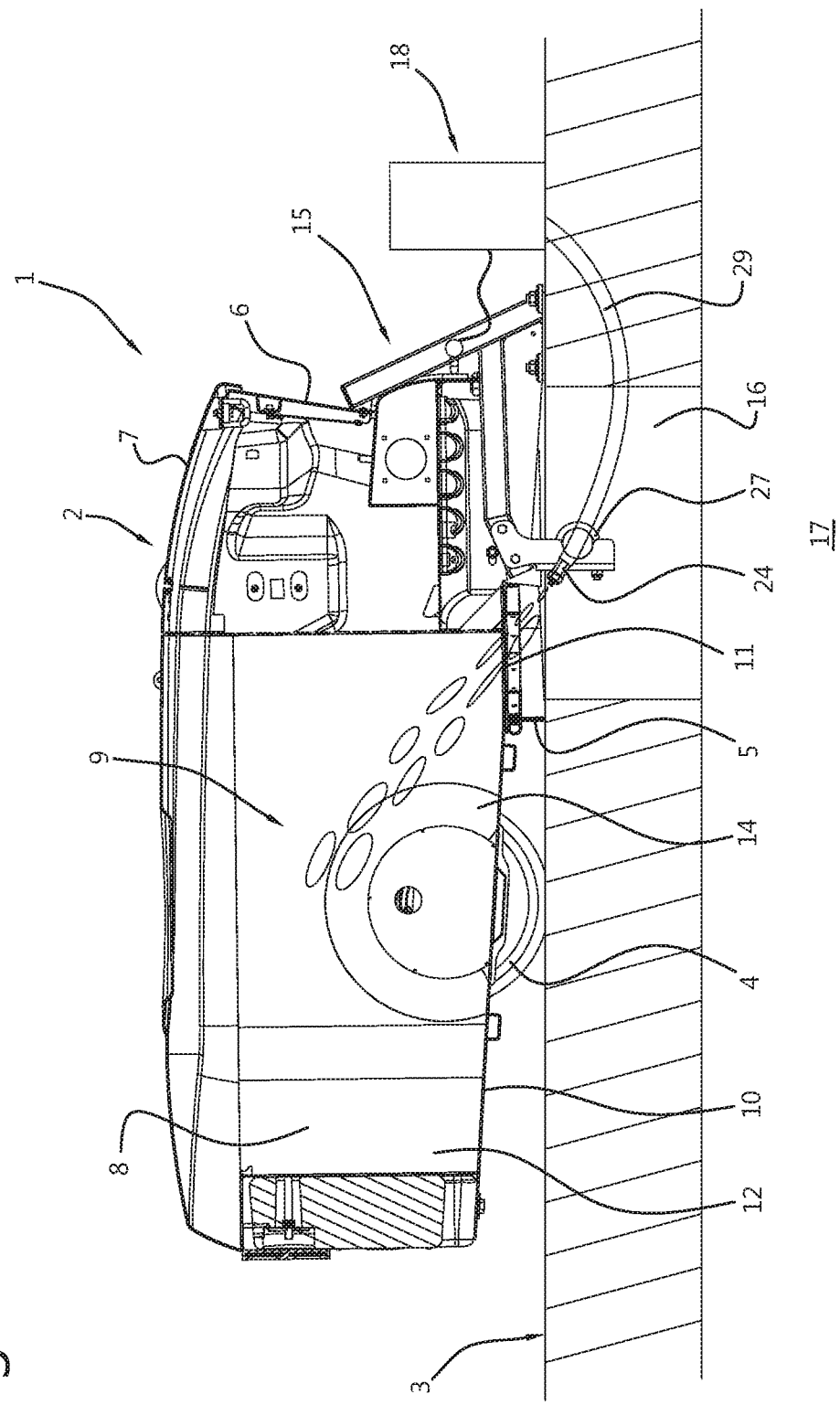
FIG. 5 shows a side view in cross section of a manure removal vehicle on a dump of a system for removing manure from a floor in an animal shed according to a second embodiment.
Figure 6:
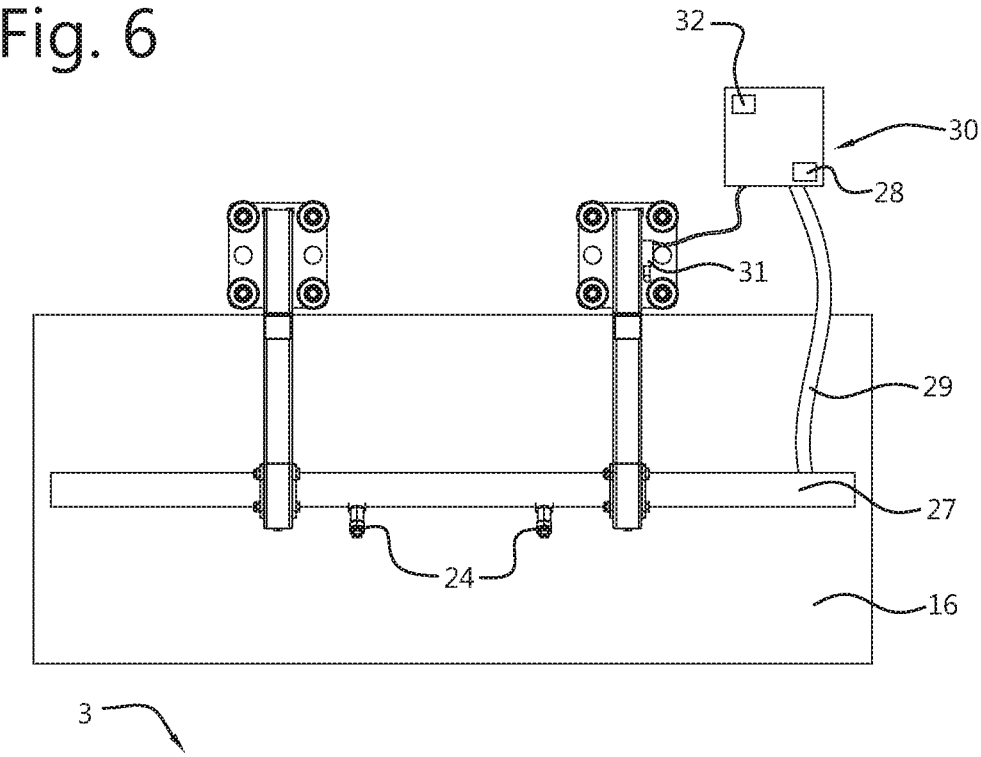
FIG. 6 shows a top view of the dump opening with the flushing device of the system for removing manure from a floor in an animal shed according to the second embodiment.

In the embodiment of the manure removal vehicle 2 illustrated in FIGS. 5 and 6, the same or similar components are denoted by the same reference numerals as above. In the embodiment illustrated in FIGS. 5 and 6, the flushing device 18 comprises two spray heads 24 which are arranged on a supply pipe 27 which extends transversely in the dump opening 16 of the dump 15. The spray heads 24 each determine a spray opening of the flushing device 18. In this case, the spray heads 24 are configured for spraying water into the interior 9 of the manure storage container 8 via the manure introduction and discharge opening 11 when the manure introduction and discharge opening 11 of the manure removal vehicle 2 is situated over the dump opening 16. Obviously, it is possible to use a single spray head or more than two spray heads. In addition, the spray heads 24 may be substituted by spray openings of a hose, for example at the ends of the hose (not shown).

With the manure removal vehicle 2 illustrated in FIGS. 5 and 6, the water reservoirs 22 illustrated in FIGS. 1-4 are missing. The water which is sprayed into the interior 9 of the manure storage container 8 by the spray heads 24 via the manure introduction and discharge opening 11 is able to reach the areas behind the wheel arches 14 substantially unhindered. The flushing device 18 provides sufficient pressure to spray the water from the spray heads 24 to the rearmost portion of the interior 9 of the manure storage container 8.

In this case, the flushing device 18 may be configured for spraying water at a water pressure which is at least 0.2 bar, in particular at least 1 bar or 3 bar higher than the atmospheric pressure. The water pressure determines the force with which the flushing device 18 sprays the flushing liquid out of the flushing device 18, in particular out of the spray head or spray heads 24. Due to the increased pressure, manure residues and other dirt is efficiently sprayed off the inner walls of the manure storage container 8. Incidentally, the flushing device 18 of the above-described embodiment according to FIGS. 1-4 may also be configured for spraying water at such an elevated pressure.

The flushing device 18 is furthermore configured for spraying the flushing liquid at a flow rate or volumetric rate of at least 3 liters per minute, in particular at least 10 liters per minute or 50 liters per minute. At such a volumetric rate ("flow"), the removal of manure and/or sand residues from the manure storage container 8 of the autonomous manure removal vehicle 2 is particularly efficient.

Although the manure removal vehicle 2 illustrated in FIGS. 5 and 6 does not have a water system to wet the floor with water while picking up manure from the floor 3, it is also possible with this embodiment of the flushing device 18 for the manure removal vehicle 2 to be provided with a water system for spraying water on the floor 3. In this case, the water system may form a separate system, i.e. not integrated with the flushing device 18. In the same way as is the case with the exemplary embodiment shown in FIGS. 1-4, the water system may, for example, comprise a water supply connection for supplying water to the water system which, in turn, is couplable to a water storage connection near the dump 15. In this case, the water reservoirs of the water system may be configured differently than is shown in FIGS. 1-4, such as one or more water reservoirs which do not form an obstruction when spraying the water through the manure introduction and discharge opening 11 to the desired areas in the interior 9 of the manure storage container 8 instead of two water bags 22. The water reservoir for example comprises a plastic or metal tank, which is arranged against a side wall in the interior 9 of the manure storage container 8 in such a way that the path of the water droplets from the spray heads 24 is not impeded.

In the exemplary embodiment illustrated in FIGS. 5 and 6, the flushing device 18 comprises a water storage connection, which is connected to the spray heads 24 by means of an operable valve 28 (diagrammatically illustrated in FIG. 6) and a supply hose 29 via the supply pipe 27. The valve 28 is operable by a control unit 30 which is operatively connected to a pressure switch 31 which is fitted to be operated by the manure removal vehicle 2 when the manure removal vehicle 2 has been driven onto the dump 15 in such a way that the manure introduction and discharge opening 11 is aligned with and over the dump opening 16.

When the pressure switch 31 is depressed, the control unit 30 opens the valve 28, so that water from the water storage connection 23 flows to the spray heads 24 via the supply hose 29 and the supply pipe 27. The spray heads 24 then start to spray water into the interior 9 of the manure storage container 8 via the manure introduction and discharge opening 11. It is possible for the control unit 30 to close the valve again when the manure removal vehicle 2 leaves the dump 15 and no longer depresses the pressure switch 31. Instead thereof, the control unit 30 may comprise a time switch 32 in order to set a flushing time. Only after the time switch 32 has signaled that the set flushing time has elapsed, the control unit 30 closes the valve 28 in order to stop the flushing action.

Figure 7:
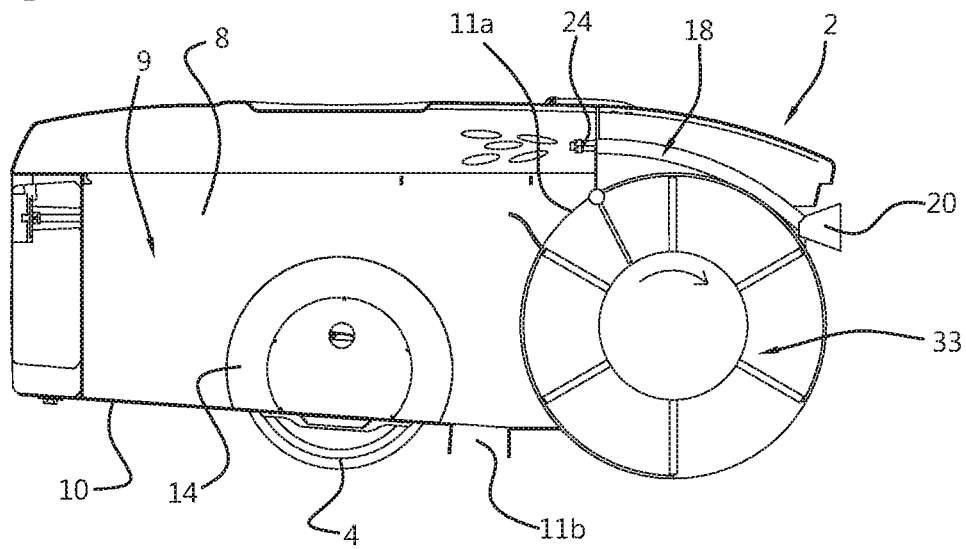
FIG. 7 shows a side view in cross section of a manure removal vehicle for use with a third embodiment of a system for removing of manure of a floor in an animal shed according to the invention.

FIG. 7 shows an alternative embodiment of a manure removal vehicle according to the invention, in which the same or similar components are again denoted by the same reference numerals. With the manure removal vehicle 2 illustrated in FIG. 7, the manure introduction device is configured differently. Instead of sucking up manure as described above, the manure introduction device comprises a mechanical scooping mechanism for scooping up manure from the floor 3. The manure removal vehicle 2 also comprises two separate openings for supplying and/or discharging manure, i.e. a manure introduction opening 11a and a manure discharge opening 11b. The manure is moved up by means of a rotating supply mechanism 33, and ends up in the interior 9 of the manure storage container 8 via the manure introduction opening 11a. The manure can be discharged via the manure discharge opening 11b. The flushing device 18 according to the invention can also be used with a manure removal vehicle 2 having such a manure introduction device in order to wash away manure and sand residues or other residual matter from the interior 9 of the manure storage container 8. Although not shown in FIG. 7, the manure removal vehicle 2 according to this embodiment may also be provided with a water system for wetting the floor 3 as described above.

The invention is not limited to the exemplary embodiment illustrated in the figures. The person skilled in the art may make various modifications which are within the scope of the invention.

The invention claimed is:

1. A system for removing manure from a floor in an animal shed, the system being provided with:
    an autonomous manure removal vehicle configured to autonomously travel along at least one route between animals in the animal shed, the manure removal vehicle comprising:
    a manure storage container provided with an interior, and a manure discharge opening for discharging manure from the interior of the manure storage container; and
    a manure introduction device for introducing manure from the floor and moving the introduced manure to the interior of the manure storage container; a dump provided with a dump opening in the floor for dumping, via the dump opening, manure from the manure discharge opening of the manure storage container into a manure reservoir extending under the floor; and
    a flushing device for flushing the interior of the manure storage container with flushing liquid,
    wherein the flushing device is arranged in or near the dump opening of the dump, wherein the flushing device is configured for spraying flushing liquid through the manure discharge opening into the interior of the manure storage container when the manure discharge opening of the manure removal vehicle is situated over the dump opening.

2. The system as claimed in claim 1, wherein the flushing device is configured for flushing the interior of the manure storage container at least while the manure storage container has substantially been emptied by and/or after dumping of manure from the manure discharge opening.

3. The system as claimed in claim 1, wherein the flushing device is configured for flushing the interior of the manure storage container while dumping manure from the manure discharge opening.

4. The system as claimed in claim 1, wherein the flushing device is configured for flushing the interior of the manure storage container for an adjustable flushing time, wherein a control system is provided, the control system being configured to adjust the flushing time.

5. The system as claimed in claim 1, wherein the manure storage container comprises a bottom sloping obliquely towards the manure discharge opening situated at a lowest level of the bottom, and wherein the flushing device is configured for spraying flushing liquid in such a way that said flushing liquid ends up in a highest area of the bottom.

6. The system as claimed in claim 1, wherein the manure removal vehicle is provided with two side walls, each of the side walls comprising a wheel arch for accommodating a wheel, wherein the side walls with the wheel arches delimit the interior of the manure storage container on an inside thereof, and wherein the flushing device is configured for spraying flushing liquid in at least one area of the interior of the manure storage container which, viewed in a direction of travel of the manure removal vehicle, is situated before and/or behind the wheel arches.

7. The system as claimed in claim 1, wherein the flushing device is at least partly arranged in the interior of the manure storage container and is configured for spraying flushing liquid into the interior of the manure storage container.

8. The system as claimed in claim 7, wherein the manure removal vehicle comprises a water system for spraying water on the floor, the water system being provided with at least one water reservoir for accommodating water, at least one spray head for spraying water on the floor, and a water supply connection for supplying water to the water system, wherein the water supply connection, the water reservoir and the spray head of the water system are connected to each other by a pipe system, and wherein the flushing device is connected to the water system.

9. The system as claimed in claim 8, wherein the water supply connection of the water system of the manure removal vehicle is couplable to a water storage connection situated near the dump for supplying water to the water system in order to fill the water reservoir and to allow the flushing device to spray water.

10. The system as claimed in claim 9, wherein the flushing device is provided with a spray head connected to a pipe of the pipe system of the water system by a non-return valve.

11. The system as claimed in claim 1, wherein the flushing device is provided with a water storage connection connected to a spray opening of the flushing device by an operable valve and a supply line, wherein the valve is operable by a control unit connected to a sensor device configured to detect if the manure discharge opening of the manure removal vehicle is situated over the dump opening.

12. The system as claimed in claim 1, wherein the flushing device is configured for spraying the flushing liquid at a pressure of at least 0.2 bar.

13. The system as claimed in claim 1, wherein the flushing device is configured for spraying the flushing liquid at a flow rate of at least 3 liters per minute.

14. A method for removing manure from a floor in an animal shed, the method comprising:
    moving an autonomous manure removal vehicle across the floor between animals in the animal shed, by making the manure removal vehicle travel autonomously along at least one route between the animals in the animal shed, wherein the manure removal vehicle picks up manure from the floor and moves the manure to an interior of a manure storage container for temporarily collecting manure therein;
    driving the manure removal vehicle to a dump provided with a dump opening in the floor for dumping manure into a manure reservoir extending under the floor;
    dumping manure from a manure discharge opening of the manure storage container of the manure removal vehicle into the manure reservoir via the dump opening;
    flushing the interior of the manure storage container with flushing liquid after and/or while dumping the manure; and
    spraying flushing liquid through the manure discharge opening into the interior of the manure storage container when the manure discharge opening of the manure removal vehicle is situated over the dump opening with a flushing device arranged in or near the dump opening of the dump.

15. The system as claimed in claim 2, wherein the flushing device is configured for flushing the interior of the manure storage container while dumping manure from the manure discharge opening.

16. The system as claimed in claim 2, wherein the flushing device is configured for flushing the interior of the manure storage container for an adjustable flushing time, wherein a control system is provided, the control system being configured to adjust the flushing time.

17. The system as claimed in claim 3, wherein the flushing device is configured for flushing the interior of the manure storage container for an adjustable flushing time, wherein a control system is provided, the control system being configured to adjust the flushing time.

18. The system as claimed in claim 2, wherein the manure storage container comprises a bottom sloping obliquely towards the manure discharge opening situated at a lowest level of the bottom, and wherein the flushing device is configured for spraying flushing liquid in such a way that said flushing liquid ends up in a highest area of the bottom.

\* \* \* \* \*